Figure 1:
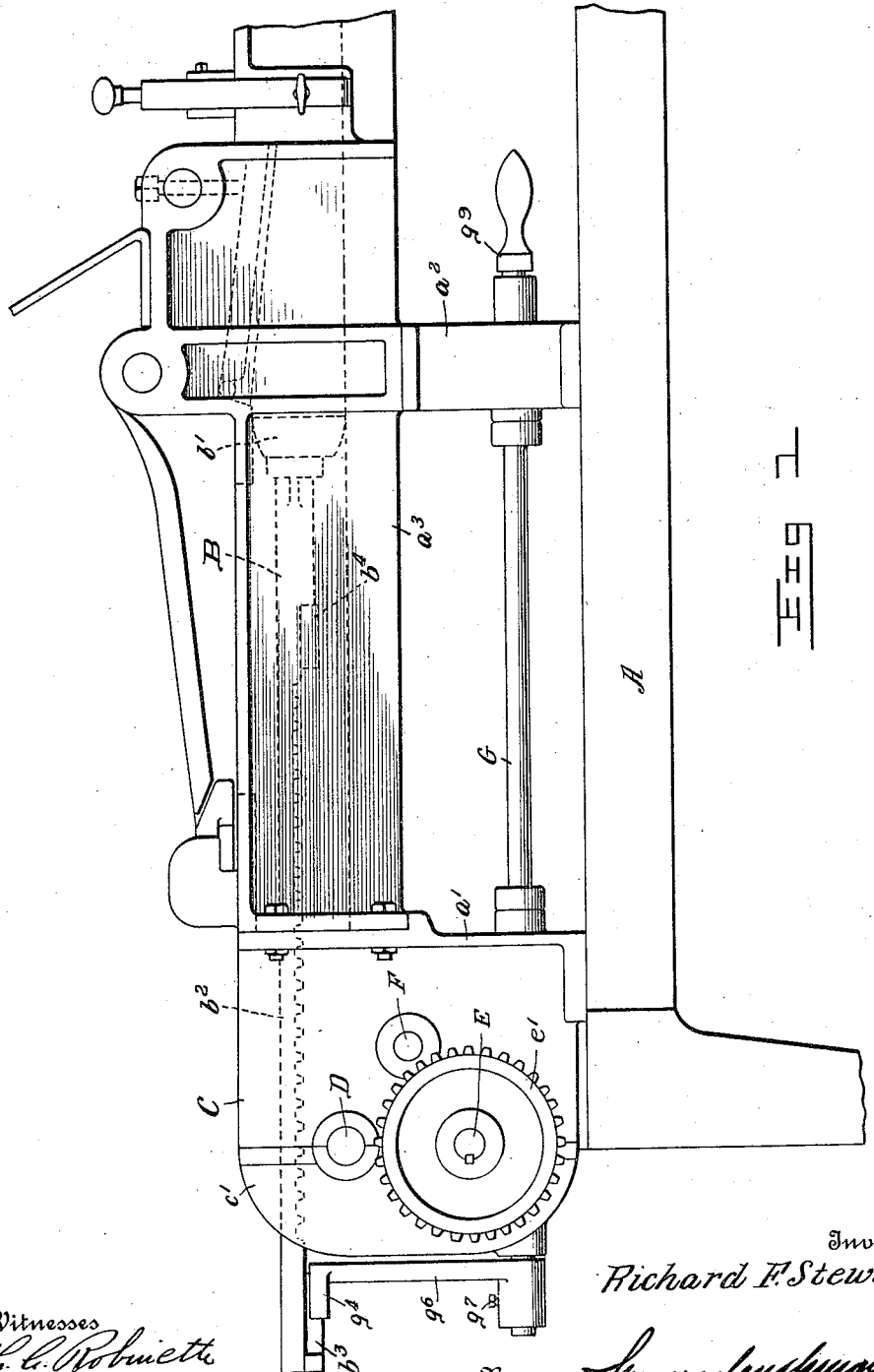

R. F. STEWART.
PLUNGER OPERATING MECHANISM FOR BUTTER HANDLING MACHINES.
APPLICATION FILED MAR. 5, 1913.

1,064,785.

Patented June 17, 1913.

R. F. STEWART.
PLUNGER OPERATING MECHANISM FOR BUTTER HANDLING MACHINES.
APPLICATION FILED MAR. 5, 1913.

1,064,785.                                          Patented June 17, 1913.
                                                         3 SHEETS—SHEET 3.

Witnesses
H. A. Robinette
J. J. Mawhinney

Inventor
Richard F. Stewart
By Luque Cushman &c
Attorney

UNITED STATES PATENT OFFICE.

RICHARD F. STEWART, OF BRIAR CLIFF MANOR, NEW YORK.

PLUNGER-OPERATING MECHANISM FOR BUTTER-HANDLING MACHINES.

1,064,785.  Specification of Letters Patent.  Patented June 17, 1913.

Application filed March 5, 1913. Serial No. 752,066.

*To all whom it may concern:*

Be it known that I, RICHARD F. STEWART, a citizen of the United States, residing at Briar Cliff Manor, in the county of Westchester and State of New York, have invented new and useful Improvements in Plunger-Operating Mechanism for Butter-Handling Machines, of which the following is a specification.

This invention relates to machines for molding and cutting soft material, such as butter or the like, and more particularly relates to a novel mechanism for actuating the feeding plunger of such machines.

At the present time, in machines of this nature the plungers thereof are driven continuously in a forward and reverse direction with but slight interruption between its movements, and the soft material is therefore automatically and continuously fed into and through the molding channels of the machine, and if the attendant is not able to remove the prints from the machine as quickly as delivered the power must be cut off and the entire machine stopped or the prints will be thrown from the receiving table.

It is an object of this invention to provide a machine of this nature with mechanism for automatically disengaging the plunger from the drive shaft, at the end of its forward end movement, and at the end of its reverse movement, this mechanism being of such a nature that it must be manually operated by the attendant to connect the plunger to the drive shaft to again strike the plunger in its travel in the opposite direction. Thus, the plunger may remain at rest as long as it is desired or necessary, and if the attendant leaves the machine the same will automatically come to a stop.

The above, and other objects and advantages of this invention will appear from one embodiment of the invention hereinafter specifically disclosed, the same comprising, broadly, a system of gearing arranged between the drive shaft and the plunger, a shiftable clutch for reversing the gearing, the clutch having abutments which are engaged by the opposite ends of the plunger to throw the clutch into neutral or disengaged position at the end of each movement of the plunger, and a device to be operated by the attendant and having connection with the clutch to shift the same to engage the gearing and move the plunger in the opposite direction.

The following disclosure of the invention is but one embodiment thereof, and is shown and described as applied to a butter handling machine, but it is to be understood that this mechanism may be modified within the scope of this invention and may be applied to a machine of any character in which such a movement is required.

Figure 2:
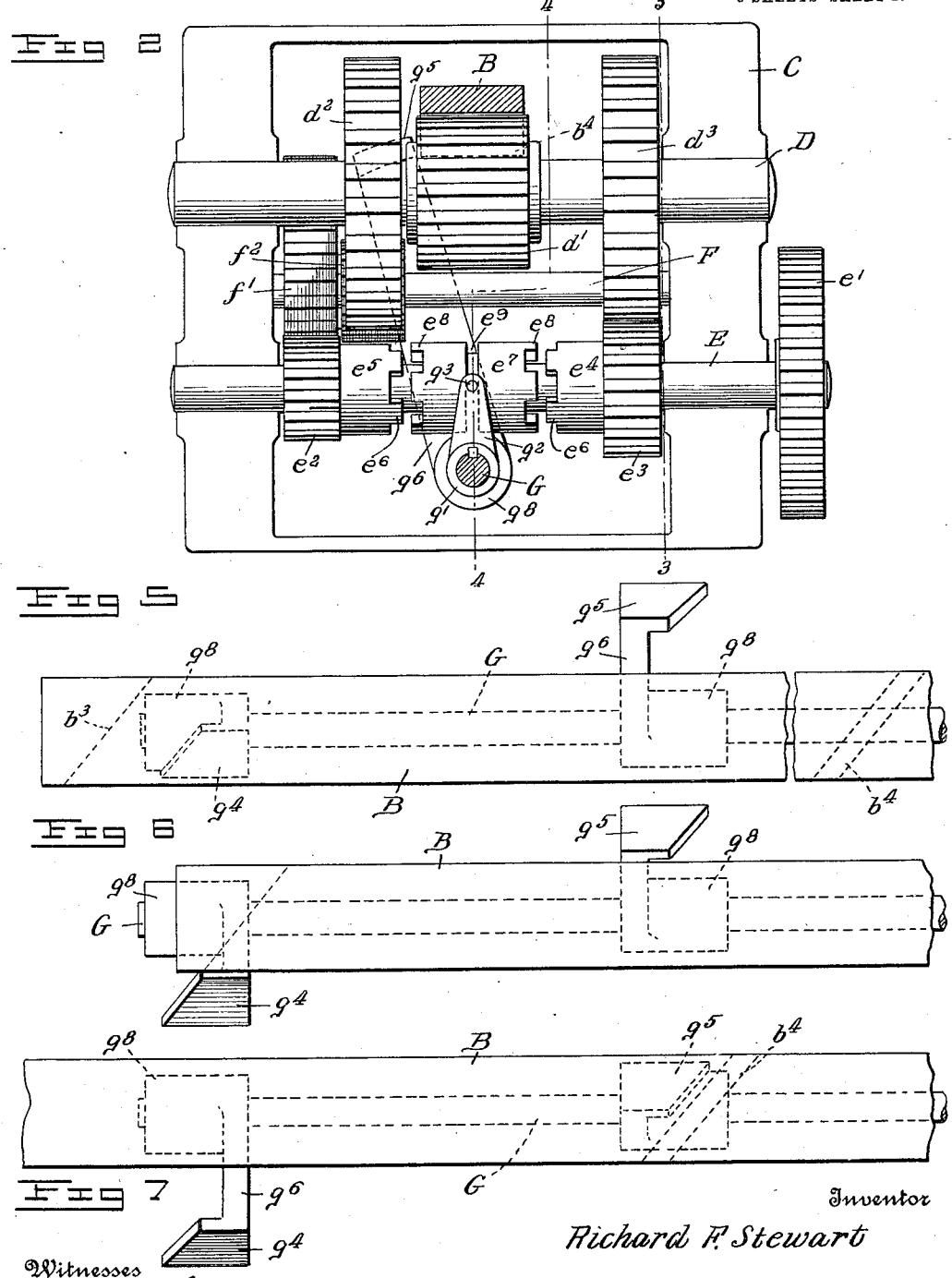
Figure 3:
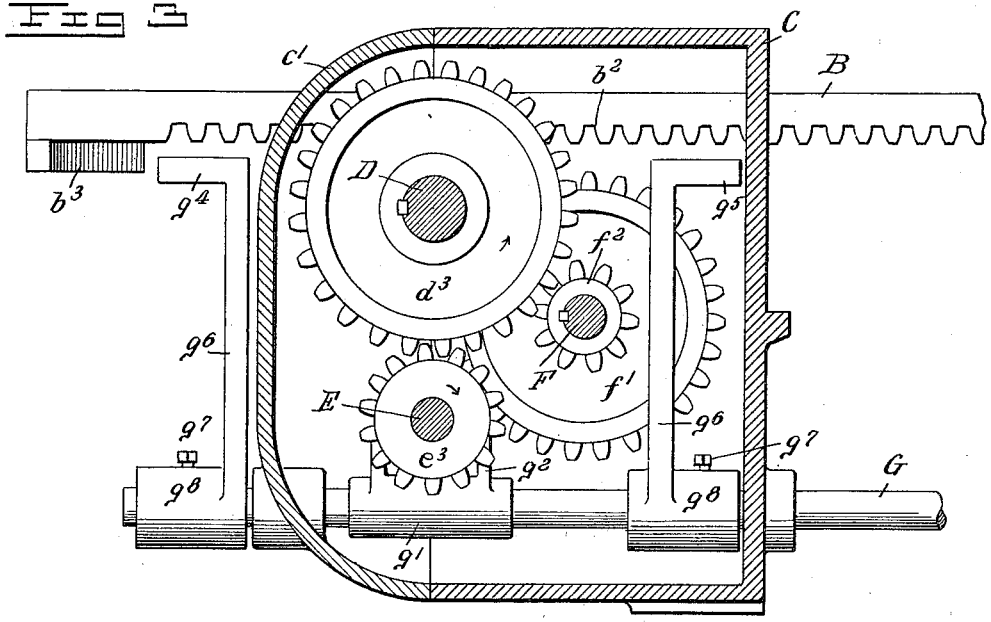
Figure 4:
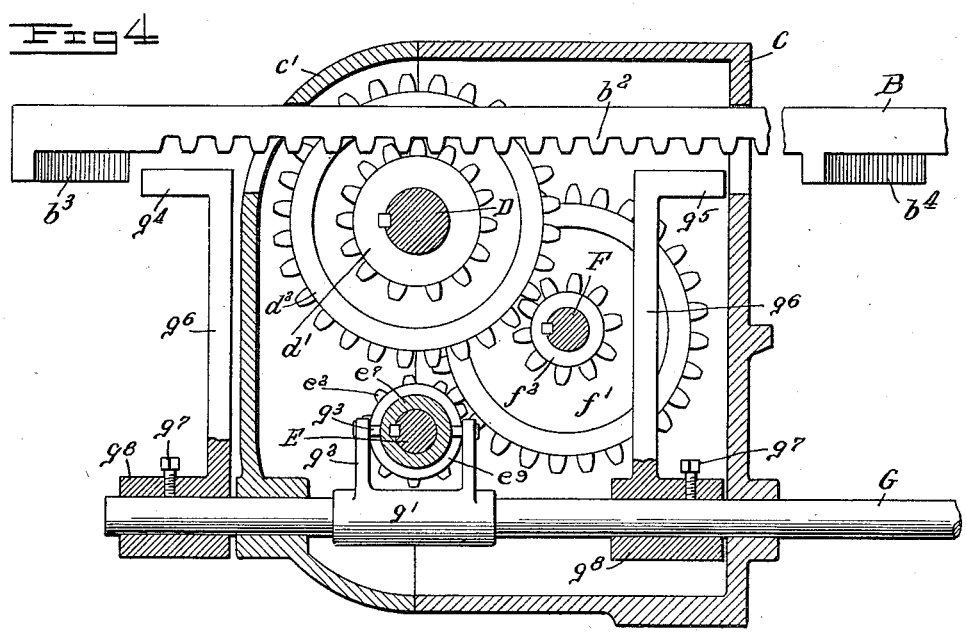

In the accompanying drawings—Figure 1 is a side elevation of a butter molding and printing machine having the mechanism of this invention applied thereto. Fig. 2 is an end elevation of the gearing in the gear box, having the cap removed. Fig. 3 is a section through the gearing taken on the line 3—3 of Fig. 2. Fig. 4 is a transverse section taken through the gearing on the line 4—4 of Fig. 2. Figs. 5, 6 and 7 are top plan views of the plunger and the abutments, showing the latter in opposed and neutral positions.

Referring to the drawings in which like characters of reference designate similar parts throughout the several views, and referring particularly to Fig. 1, A designates the table of the butter molding and printing machine shown, and from which rises the spaced brackets $a^1$ and $a^2$ supporting the feed box $a^3$ for the soft material, such as butter or the like. In this Fig. 1 there is disclosed only sufficiently of the butter handling machine to show the application of the present invention since the invention relates solely to the feeding of the plunger.

Within the feed box $a^3$ is suitably mounted for longitudinal reciprocation a plunger B provided with a head $b^1$ adapted to engage the soft material and force it forwardly from the feed box $a^3$ into the machine. The plunger B projects through the rear end of the feed box $a^3$ to a considerable distance and is provided in its underside with a rack $b^2$ extending from a point near its outer end to a point considerably past the intermediate part of the plunger. The plunger B is also provided upon its underside with a pair of inclines or blocks $b^3$ and $b^4$, the same being located one slightly beyond each end of the rack and having their faces extending in the same direction and toward each other.

Mounted upon the rear end of the table A and against the standard $a^1$ is a gear box C rising to a point preferably above the plunger B and being provided with suitable openings in its opposite ends through which the plunger reciprocates. A detachable cap $c^1$ closes the rear end of the gear box C and houses the improved mechanism hereinafter fully described.

In the gear box C is journaled a transverse driven shaft D to the middle portion of which is keyed a pinion $d^1$ of a width substantially equal to the width of the plunger B and meshing therewith. On the shaft D, and at the opposite sides of the pinion $d^1$ are the gears $d^2$ and $d^3$, said gears being keyed to the shaft and adapted to drive the same in opposite directions as hereinafter set forth.

Journaled transversely in the gear box C, and preferably arranged immediately below the driven shaft D is the drive shaft E. This drive shaft E has one end extended beyond the side of the gear box C and carries on such end and against the outer side of the gear box a drive gear $e^1$. The drive shaft E is further provided within the gear box C, with a pair of spaced apart pinions $e^2$ and $e^3$. These pinions $e^2$ and $e^3$ are loose upon the drive shaft E and are provided with hubs $e^4$ and $e^5$ projecting laterally from the pinions and toward one another, the hubs being provided with clutch teeth $e^6$. In Fig. 2 of the drawings this construction is shown to advantage, and from this figure it will be noted that the pinion $e^3$ meshes at all times with the gear $d^3$. On the drive shaft E and between the hubs $e^4$ and $e^5$ is a clutch sleeve $e^7$ slidable longitudinally on the shaft and being keyed thereto so as to turn with the shaft. This sleeve $e^7$ is of such length that it may rest in a neutral position, such as disclosed in Fig. 2, wherein the teeth $e^8$ of the clutch sleeve are disengaged from the teeth $e^6$ on both of the hubs $e^4$ and $e^5$. The clutch sleeve $e^7$ is further provided intermediate its ends with an annular groove $e^9$ for the purpose hereinafter set forth.

As will be seen particularly from Figs. 2, 3 and 4, the gear box is provided with a counter-shaft F journaled transversely in the gear box C and located forwardly of and being equally distanced or spaced from the drive shaft E and the driven shaft D. This counter-shaft F has keyed near one end thereof a gear $f^1$ meshing with the pinion $e^2$ of the drive shaft, the counter-shaft F also having a pinion $f^2$ meshing with the gear $d^2$ on the driven shaft.

For the purpose of actuating the clutch $e^7$ the gear box C is provided with a rock shaft G journaled longitudinally through the gear box and extending, as shown in Fig. 1, through the standards $a^1$ and $a^2$ of the machine. Keyed on the rock shaft G is a sleeve $g^1$ provided with a pair of laterally extended and spaced apart arms $g^2$ extending up against the opposite sides of the clutch $e^7$ and having at their upper ends inwardly extending pins $g^3$ engaging in the groove $e^9$ of the clutch. It is thus seen that by rocking the shaft G the clutch $e^7$ is moved first toward one hub, $e^4$, and then toward the opposite hub, $e^5$. The rock shaft G carries a pair of abutments $g^4$ and $g^5$, the latter being supported on arms $g^6$ extending laterally from the rock shaft G and being adjustable thereon in any suitable manner as by the set screws $g^7$ engaging through the bosses $g^8$ of the arms $g^6$. The abutment $g^5$ is located within the forward end of the gear box C, and as may be seen from Figs. 5, 6 and 7 has an inclined forward face adapted to receive thereagainst the inclined face of the block $b^4$ of the plunger when the latter has nearly completed its backward or reverse movement. The other abutment $g^4$ is arranged outside and in the rear of the gear box C and is provided with an inclined rear face to be engaged by the corresponding inclined inner face of the block $b^3$ carried upon the plunger when the latter has nearly completed its forward movement. From Fig. 6 it will be noted that the arms $g^6$ are so adjusted upon the rock shaft G as to dispose the abutments $g^4$ and $g^5$ on opposite sides of the plunger and out of the path of the blocks $b^3$ and $b^4$. When the abutments are in this position the clutch $e^7$ is in neutral position or is out of engagement with both of the hubs $e^4$ and $e^5$.

When one of the blocks $b^3$ has tripped the rock shaft G to throw the clutch $e^7$ in neutral position the plunger B can be operated only by the movement of the shaft G manually or by some mechanism external of the gear box C. It is found desirable to provide the rock shaft G with means for manually moving the shaft in either one direction or the other to move the clutch into engagement with the hub $e^4$ or hub $e^5$. This manually operable means comprises a crank handle $g^9$ or any other suitable hand device secured upon the shaft G, preferably at a point beyond the forward standard $a^1$. In this position the handle $g^9$ is within reaching distance of the operator when controlling the passage of the soft material through the machine.

In use the operation of the improved mechanism is as follows: When the machine has its plunger B in the position disclosed in Fig. 1, and it is desired to set the machine in motion, the attendant pushes down upon the laterally projecting crank handle $g^9$ and turns the rock shaft G clockwise, as shown in Fig. 2, and moves the clutch out of neutral position into engagement with the hub $e^4$. Since the clutch $e^7$ is keyed to the drive shaft E the pinion $e^3$ is immediately set in motion and caused to turn the intermeshing gear $d^3$ to rotate the driven shaft D in a reverse direction, or in the direction shown by the arrow in Fig. 3 of the drawings. The clutch $e^7$ remains in interlocked position with the hub $e^4$ until the block $b^4$ strikes the abutment $g^5$, which action takes place a short time prior to the end of travel of the plunger B in its backward or reverse movement. As soon as the abutment $g^5$ is struck, the inclined faces of the block and the abutment slide past one another and the abutment $g^5$ is thrown laterally out of the path of the block $b^4$. Fig. 7 shows the block $b^4$ striking the abutment $g^5$, and Fig. 6 shows the position of the abutment $g^5$ after the same has been struck by the block $b^4$. This movement of the abutment $g^5$ turns the shaft G and moves the clutch $e^7$ to neutral position. The momentum of the plunger B is now depended on to carry the plunger through the remainder of its reverse or backward movement, the distance of the block $b^4$ being so gaged, with respect to the end of the plunger, that the plunger will come to rest at the end of its reverse movement and will not re-bound by reason of impact. The plunger is now brought to rest and will remain in such position until some external means turns the rock shaft G to throw the clutch into engagement with the hub $e^5$. If it is desired to feed the plunger forwardly the operator is again compelled to grasp the handle $g^9$, this time raising the handle, whereupon the abutment $g^4$ is moved into the path of the block $b^3$, as shown in Fig. 5, and the abutment $g^5$ is moved farther out of the path of the block $b^4$. This movement of the abutment $g^4$ into the path of the block $g^3$ shifts the clutch $e^7$ into engagement with the hub $e^5$ thus coupling the pinion $e^2$ to the clutch and turning the pinion. The pinion $e^2$ revolves the gear $f^1$, the counter-shaft F, and the pinion $f^2$ which latter pinion turns the gear $d^2$ and rotates the driven shaft D in an opposite direction so as to move the plunger B forwardly in the machine. The mechanism moves uninterruptedly until the plunger B reaches the end of its forward movement. At this point the block $b^3$ strikes the abutment $g^4$ and, owing to the inclinations of the faces of the abutment and the block, the abutment $g^4$ is moved laterally from the path of the block $b^3$, the abutment moving to the opposite side of the plunger B. This movement again throws the clutch $e^7$ into neutral position and the plunger is again brought to a stop. Thus, at the end of each movement of the plunger it is necessary to manually couple the plunger to the drive shaft in order to again start the operation of the machine.

Although this structure is more particularly adapted and found to be a great improvement in the art of butter handling machines, it will be understood that the mechanism may be readily applied to various types of machines, and that the system of gearing above disclosed may be modified to adapt the mechanism to varying circumstances met with in installing the mechanism.

What is claimed is—

1. In a butter handling machine, a butter receiving chamber, a plunger in the chamber having inclined blocks near its opposite ends, a driven shaft connected to said plunger for actuating the same, a drive shaft, gears between the drive and driven shafts, a clutch for automatically connecting said gears whereby to actuate said driven shaft in opposite directions, spaced apart abutments connected to said clutch and arranged at the opposite sides of the plunger and means for moving either one of said abutments into the path of the plunger whereby one of said blocks is adapted to strike the corresponding abutment and throw the same out of the path of the plunger to shift the clutch out of engagement with said gears.

2. In a butter handling machine, a butter receiving chamber, a plunger in said chamber, a driven shaft connected to the plunger for moving the same, a drive shaft, a train of gears connecting the drive and driven shafts to move the plunger in one direction, a second train of gears between said drive and driven shafts to move the plunger in the opposite direction, a clutch disposed between said drive shaft and said trains of gears, manually operable means connected to the clutch for shifting the same into engagement with one of the trains of gears, and automatically operating means in the path of said plunger adapted to be engaged whereby to throw said clutch out of engagement with said train of gears.

3. In a butter handling machine, a butter receiving chamber, a plunger in said chamber, a driving element, a driven element, means disposed between said elements for moving the plunger in one direction, a second means disposed between said elements for driving the plunger in the opposite direction, a trip mechanism disposed between the driving element and said means and adapted to connect one of the means operatively to said driving element, said tripping mechanism being located in the path of the plunger and adapted to be actuated thereby at predetermined times to release said means from said driving element, and a manually controlled device connected to said tripping mechanism whereby to connect the same to said second means.

4. In a butter handling machine, a butter receiving chamber, a plunger in said chamber, a driven shaft connected to said plunger, a drive shaft, a train of gears connecting said drive and driven shafts, a clutch connecting said drive shaft to said train of gears, means controlled by the plunger for releasing said clutch and freeing said train of gears, a second train of gears, manually operated means connected to the clutch adapted to move said clutch into engagement with said second set of gears, and automatically controlled means adapted for engagement with the plunger to release said clutch from said second train of gears, said trains of gears being adapted to operate said plunger in opposite directions.

5. In a butter handling machine, a table, a butter receiving chamber mounted on the table, a gear box mounted on the table, a plunger operable in said chamber and projecting through the gear box, a driven shaft arranged transversely in the gear box, a pinion keyed to said driven shaft, a rack on said plunger meshing with said pinion, a drive shaft journaled in said gear box, a train of gears carried on said drive and driven shafts, the gear of said train on the driven shaft being free to turn thereon and having clutch teeth, a second train of gears on said shafts the gear of said second train on the drive shaft being free to turn thereon and having clutch teeth, a clutch member on said drive shaft for movement between the clutch teeth of both of said gears, a rock shaft journaled in the box and arranged in parallelism with said plunger, the rock shaft having connection with said clutch member, and spaced apart arms carried on said rock shaft and lying in the path of said plunger for engagement therewith at the ends of the strokes of the plunger whereby to move said rock shaft and shift said clutch member.

In testimony whereof I have hereunto set my hand in presence of two subscribing witnesses.

RICHARD F. STEWART.

Witnesses:
 IRVING GAMBET,
 KATHERINE C. GLANVILLE.

---

Copies of this patent may be obtained for five cents each, by addressing the "Commissioner of Patents, Washington, D. C."